(12) United States Patent
Surcouf et al.

(10) Patent No.: US 12,015,673 B1
(45) Date of Patent: Jun. 18, 2024

(54) EVENTUALLY-CONSISTENT MESSAGE DELIVERY SYSTEM FOR EDGE APPLICATIONS

(71) Applicant: Cisco Technology, Inc., San Jose, CA (US)

(72) Inventors: Andre Jean Marie Surcouf, Saint-Leu-la-Forêt (FR); Trevor Adam Whinmill, Nuneaton (GB); Benjamin William Ryder, Lausanne (CH); Pablo Garcia del Valle, Chavannes-près-Renens (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/457,640

(22) Filed: Aug. 29, 2023

(51) Int. Cl.
*H04L 67/141* (2022.01)
*H04L 67/10* (2022.01)

(52) U.S. Cl.
CPC ............ *H04L 67/141* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,882,855 B1 | 1/2018 | Twitchell et al. | |
| 11,336,570 B1* | 5/2022 | K N | H04L 45/42 |
| 11,765,126 B2* | 9/2023 | Roy | H04L 67/12 |
| | | | 709/245 |
| 11,886,864 B1* | 1/2024 | Govindarajan | G06F 8/65 |
| 2012/0102183 A1 | 4/2012 | Murakami et al. | |
| 2016/0234157 A1 | 8/2016 | Mahoney et al. | |
| 2019/0253480 A1 | 8/2019 | Chiu et al. | |
| 2020/0178198 A1* | 6/2020 | Ding | H04W 60/04 |
| 2022/0006880 A1 | 1/2022 | Fitzer et al. | |
| 2022/0078133 A1* | 3/2022 | Trang | H04L 47/781 |
| 2023/0056096 A1* | 2/2023 | Luo | H04L 41/12 |
| 2023/0367833 A1* | 11/2023 | Kol | G06F 16/9566 |

\* cited by examiner

Primary Examiner — Quang N Nguyen
(74) Attorney, Agent, or Firm — Baker Botts L.L.P.

(57) ABSTRACT

In one embodiment, a method by a site router agent at an edge site comprises determining that a first application instance becomes running on the edge site, where the first application instance is associated with a first unique identifying information, sending a report to a control plane of an edge backend indicating that the first application instance becomes available at the edge site, retrieving a first message from a message router at the edge backend, determining that the first message is destined to the first application instance based on a destination field of the first message, storing the first message into a storage communicatively connected to the site router agent, establishing a network connection with the first application instance, and sending the first message to the first application instance upon establishing the network connection.

20 Claims, 4 Drawing Sheets

EVENTUALLY-CONSISTENT MESSAGE DELIVERY SYSTEM FOR EDGE APPLICATIONS

TECHNICAL FIELD

The present disclosure relates generally to distributed edge networks, and more particularly, to eventually-consistent message delivery system for edge applications.

BACKGROUND

The adoption of cloud technologies and cloud-based services is rising constantly, but situations requiring running an application locally exist. For example, an application may need to run locally because of regulatory, security or performance reasons. A well-designed edge management system may provide an ability to develop and run modern applications at an edge site by bringing the resilience and flexibility of the cloud to the edge. The edge management system may be built on Kubernetes®. A control plane of the edge management system runs in the cloud and may communicate with each site. The control plane manages nodes, sites, and applications. Edge application instances running at edge sites may need to communicate with external entities as well as between themselves. Those edge application instances running at edge sites may suffer from poor or intermittent network connectivity. The application instances running at the edge sites may experience unreliable communications or disrupted communications. When an external entity sends a message to an edge application instance, the edge application instance may not be reachable for an unpredictable amount of time. Existing legacy communication systems for edge applications may not provide any guarantee of delivery.

DESCRIPTION OF EXAMPLE EMBODIMENTS

Overview

Figure 1:
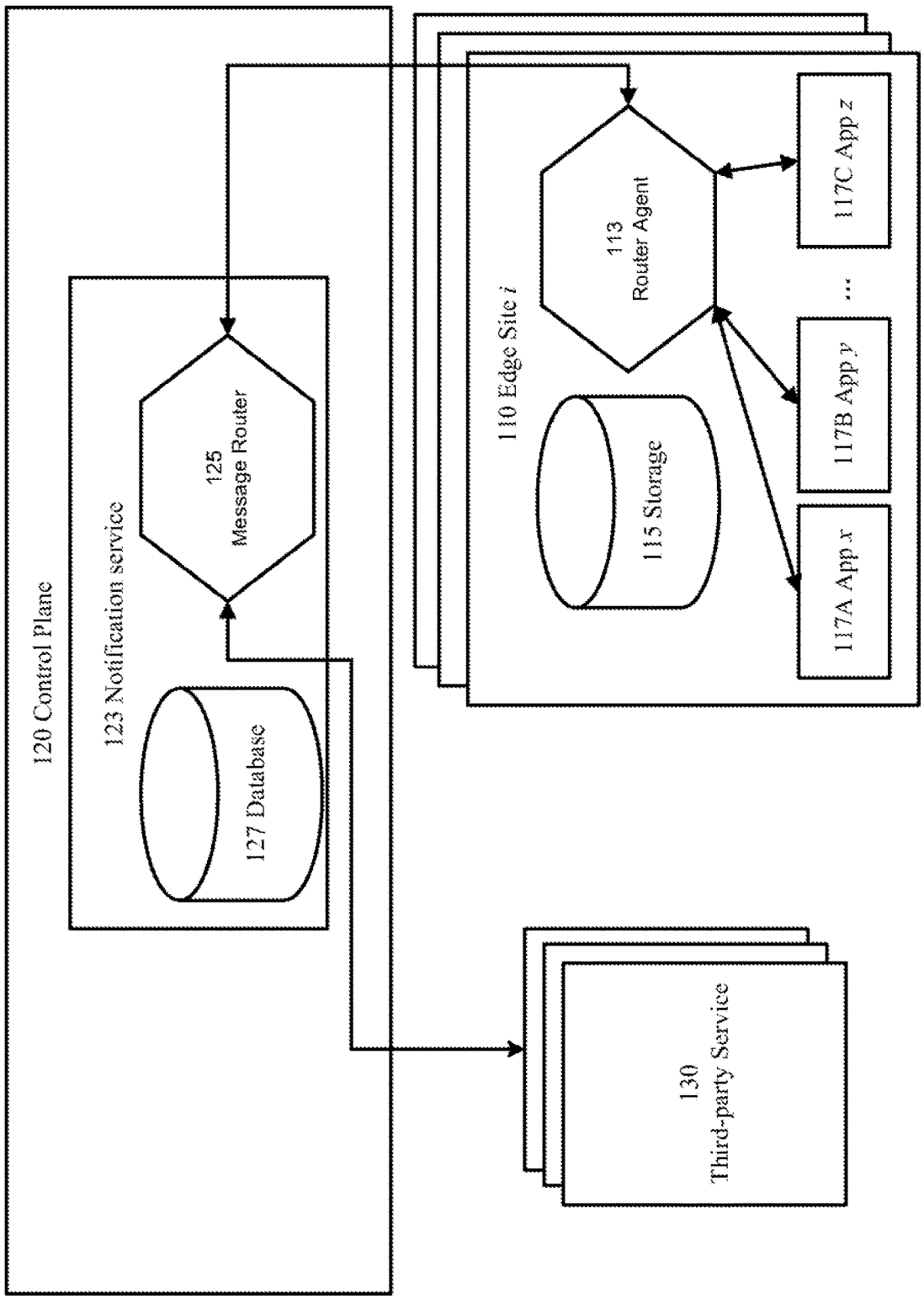
FIG. 1 illustrates an example logical architecture of an edge management system control plane for message delivery.

In one or more embodiments, a method, by a site router agent at an edge site, may comprise determining that a first application instance becomes running on the edge site. The first application instance may be associated with a first unique identifying information comprising a first globally unique identifying information and a first locally unique identifying information. The method may comprise sending a report to a control plane of an edge backend indicating that the first application instance becomes available at the edge site. The report may comprise the first locally unique identifying information. The method may comprise retrieving a first message from a message router at the edge backend. The method may comprise determining that the first message is destined to the first application instance based on a destination field of the first message. The method may comprise storing the first message into a storage communicatively connected to the site router agent. The method may comprise establishing a network connection with the first application instance. The method may further comprise sending the first message to the first application instance upon establishing the network connection.

In particular embodiments, a system may comprise one or more processors, and one or more computer-readable non-transitory storage media coupled to one or more of the processors. The one or more computer-readable non-transitory storage media may comprise instructions operable when executed by one or more of the processors to cause a site router agent at an edge site to determine that a first application instance becomes running on the edge site. The first application instance may be associated with a first unique identifying information comprising a first globally unique identifying information and a first locally unique identifying information. The processors are further operable when executing the instructions to cause the site router agent to send a report to a control plane of an edge backend indicating that the first application instance becomes available at the edge site. The report may comprise the first locally unique identifying information. The processors are further operable when executing the instructions to cause the site router agent to retrieve a first message from a message router at the edge backend. The processors are further operable when executing the instructions to cause the site router agent to determine that the first message is destined to the first application instance based on a destination field of the first message. The processors are further operable when executing the instructions to cause the site router agent to store the first message into a storage communicatively connected to the site router agent. The processors are further operable when executing the instructions to cause the site router agent to establish a network connection with the first application instance. The processors are further operable when executing the instructions to cause the site router agent to send the first message to the first application instance upon establishing the network connection.

In one or more embodiments, one or more computer-readable non-transitory storage media may embody software that is operable, when executed by a site router agent at an edge site, to determine that a first application instance becomes running on the edge site. The first application instance may be associated with a first unique identifying information comprising a first globally unique identifying information and a first locally unique identifying information. The software may be further operable when executed by the site router agent to send a report to a control plane of an edge backend indicating that the first application instance becomes available at the edge site. The report may comprise the first locally unique identifying information. The software may be further operable when executed by the site router agent to retrieve a first message from a message router at the edge backend. The software may be further operable when executed by the site router agent to determine that the first message is destined to the first application instance based on a destination field of the first message. The software may be further operable when executed by the site router agent to store the first message into a storage communicatively connected to the site router agent. The software may be further operable when executed by the site router agent to establish a network connection with the first application instance. The software may be further operable when executed by the site router agent to send the first message to the first application instance upon establishing the network connection.

EXAMPLE EMBODIMENTS

In particular embodiments, a control plane of an edge management system may deliver messages from and to edge applications having poor or intermittent network connectivity. The adoption of cloud technologies and cloud-based services is rising constantly, but situations requiring running an application locally exist. For example, an application may need to run locally because of regulatory, security or performance reasons. A well-designed edge management system may provide an ability to develop and run modern applications at an edge site by bringing the resilience and flexibility of the cloud to the edge. Even though edge devices often have limited resources, an edge management system may be designed with scalability in mind, such that the edge management system may handle application deployments across several nodes per sites easily, even across thousands of sites. In particular embodiments, the edge management system may be built on Kubernetes®. An edge node is a physical or virtual edge device that can run a container instance, such as Kubernetes® container. The edge nodes may be grouped into logical units called edge sites. For example, sites may be created based on the physical location of the facilities. Then, each node may be assigned to one of the sites where the node is located.

A control plane of the edge management system may be a SaaS solution that may be running in the cloud and may communicate with each site. The control plane may manage nodes, sites, and applications. The edge management system should be able to take care of deploying and running the applications on the selected sites and keep them running. For example, the edge management system may reconfigure application at runtime or redeploy applications when a node fails. The edge management system may also optimally manage the resource requirements of the applications on the available nodes.

Application instances running at edge sites may need to communicate with external entities as well as between themselves. Those application instances running at edge sites may suffer from poor or intermittent network connectivity. The application instances running at the edge sites may experience unreliable communications or disrupted communications. Consequently, legacy edge applications that require network communications with one or more entities needed to implement application-specific communication systems. However, the existing legacy communication systems for edge applications may not provide any guarantee of delivery. The system and methods disclosed herein may utilize a control plane of the edge management system to deliver messages to and from edge application instances in an eventually-consistent manner.

In particular embodiments, a site router agent at an edge site may receive a registration request from the first application instance. The registration request may comprise a first unique identifying information associated with the first application instance. The site router agent at an edge site may determine that a first application instance becomes running on the edge site. The first unique identifying information may comprise a first globally unique identifying information and a first locally unique identifying information. The first globally unique identifying information may comprise a tenant identifier and a site identifier associated with the edge site. The first locally unique identifying information may comprise an application identifier, a deployment identifier, and an instance sequence number. The site router agent may send a report to a control plane of an edge backend indicating that the first application instance becomes available at the edge site. The report may comprise the first locally unique identifying information. Upon receiving the report, the control plane may construct the first unique identifying information by combining the first globally unique identifying information with the received first locally unique identifying information. The control plane may store the first unique identifying information into a database communicatively connected to the control plane.

In particular embodiments, the site router agent may retrieve a first message from a message router at the edge backend by initiating a communication with the message router. Message deliveries between a site router agent and the message router at the edge backend may be always initiated by the site router agent. The site router agent may determine that the first message is destined to the first application instance based on a destination field of the first message. The site router agent may determine that the first message is destined to the first application instance by determining, for each position of the first unique identifying information, that an identifier at the position of the first unique identifying information matches an identifier at a corresponding position of a destination information presented in the destination field. In particular embodiments, the destination information may comprise a wildcard identifier at a particular position to indicate that any identifier at a corresponding position of a unique identifying information matches the wildcard identifier. In particular embodiments, the destination information may comprise a list of identifiers at a particular position to indicate that any identifier in the list at a corresponding position of a unique identifying information matches the list of identifiers. The site router agent may store the first message into a storage communicatively connected to the site router agent.

The site router agent may establish a network connection with the first application instance. In particular embodiments, establishing the network connection with the first application instance may be initiated by the first application instance. The site router agent may receive a network connection request from the first application instance. The site router agent may complete the network connection establishment upon receiving the network connection request from the first application instance. In particular embodiments, establishing the network connection with the first application instance may comprise initiating the establishment of the network connection by the site router agent. The site router agent may send a network connection request to the first application instance repeatedly until the site router agent receives a response to the network connection request from the first application instance. The site router agent may complete the network connection establishment upon receiving the response. The site router agent may send the first message to the first application instance upon establishing the network connection.

In particular embodiments, the first message may comprise an indication that a delivery notification is required. In such a case, the site router agent may forward a delivery notification to the message router indicating that the first message is successfully delivered to the first application instance after sending the first message to the first application instance. An intended receiver of the delivery notification may be a sender of the first message.

In particular embodiments, the site router agent may receive a second message from the first application instance.

In particular embodiments, the site router agent may determine that at least one or more intended receivers of the second message are outside the edge site based on a destination field of the second message. The site router agent may forward the second message to the message router. The network connection with the message router may not be established immediately. In such a case, the site router agent may store the second message to the storage. The site router agent may establish a network connection with the message router by repeatedly attempting to connect when an attempt fails. The site router agent may send the second message to the message router via the established network connection. Then, the site router agent may remove the second message from the storage. In particular embodiments, the site router agent may determine that at least one or more intended receivers of the second message are second application instances running on the edge site based on a destination field of the second message. The site router agent may store the second message to the storage. The site router agent may send the second message to each of the second application instances. In particular embodiments, the site router agent may store a copy of the second message for each of the second application instances. In such a scenario, the site router agent may remove a corresponding copy of the second message from the storage after sending the second message to each of the second application instances. In particular embodiments, the site router agent may store a copy of the second message and a list of the second application instances. The site router agent may update the list after sending the second message to each of the second application instance to indicate that sending the second message to the second application instance is completed. After sending the second message to all second application instances in the list, the site router agent may remove the second message and the list from the storage.

Technical advantages of certain embodiments of this disclosure may include one or more of the following. Certain apparatus and methods described herein may deliver a message to/from an edge application instance having unreliable or intermittent network connectivity in an eventually-consistent manner. The apparatus and the method may reduce an amount of total network traffic for delivering messages to/from edge application instances by eliminating a need of end-to-end message retransmissions. The apparatus and the method may reduce an amount of computing resources for sending and receiving messages by an edge application instance by caching the messages at a message router or at a site router agent.

Other technical advantages will be readily apparent to one skilled in the art from the following figures, descriptions, and claims. Moreover, while specific advantages have been enumerated above, various embodiments may include all, some, or none of the enumerated advantages.

FIG. 1 illustrates an example logical architecture of an edge management system control plane for message delivery. In the example illustrated in FIG. 1, a control plane 120 of an edge management system may comprise a notification service 123. The notification service 123 may comprise a message router 125 and a database 127 communicatively connected to the message router 125. Each of one or more third-party services 130 may register with the notification service 123 to get a corresponding unique external service identifier. The notification service 123 may perform authentication and authorization processes during the registration of a third-party service 130. An edge system may comprise a plurality of edge sites. Each edge site 110 may comprise a site router agent 113 and a storage 115 communicatively connected to the site router agent 113. A plurality of applications including application x 117A, application y 117B, and application z 117C may run on an edge site i 110. As the edge applications at the edge site i 110 may have poor or intermittent network connectivity, the edge applications including x 117A, y 117B, and z 117C may utilize the site router agent 113 for sending and receiving messages in an eventually-consistent manner. The site router agent 113 may establish a network connection with the message router 125 to relay inbound and outbound messages for the applications running at the edge site i 110. The network connectivity between the message router 125 and the site router agent 113 may be intermittent as well. Although this disclosure describes a particular logical architecture of an edge management system control plane for message delivery, this disclosure contemplates any suitable logical architecture of an edge management system control plane for message delivery.

In particular embodiments, a site router agent at an edge site may receive a registration request from the first application instance. The registration request may comprise a first unique identifying information associated with the first application instance. The site router agent at an edge site may determine that a first application instance becomes running on the edge site. The first unique identifying information may comprise a first globally unique identifying information and a first locally unique identifying information. The first globally unique identifying information may comprise a tenant identifier and a site identifier associated with the edge site. The first locally unique identifying information may comprise an application identifier, a deployment identifier, and an instance sequence number. As an example and not by way of limitation, continuing with a prior example illustrated in FIG. 1, the site router agent 113 at the edge site i 110 may determine that application x 117A is running at the edge site i 110. In particular embodiments, the site router agent 113 may determine that application x 117A is running at the edge site i 110 by receiving a registration request from application x 117A. In particular embodiments, the site router agent 113 may determine that application x 117A is running at the edge site i 110 by any other suitable manner. For example, the site router agent 113 may determine that application x 117A is running at the edge site i 110 based on configuration information associated with the edge site i 110. Application x 117A may be associated with a first unique identifying information comprising a first globally unique identifying information and a first locally unique identifying information. A unique identifying information for an edge application may have a hierarchical identifier structure. For example, the unique identifying information may comprise a tenant identifier, a site identifier, an application identifier, a deployment identifier, and an instance identifier. In particular embodiments, the instance identifier may be a sequence number. The tenant identifier and the site identifier of the unique identifying information may form a globally unique identifying information as a combination of the tenant identifier and the site identifier may identify an edge site in a globally unique manner. The application identifier, the deployment identifier and the instance identifier of the unique identifying information may form a locally unique identifying information as a combination of the application identifier, the deployment identifier and the instance identifier may uniquely identify an application instance within an edge site. Although this disclosure describes determining that an application instance is running on the edge site in a particular manner, this disclosure contemplates determining that an application instance is running on the edge site in any suitable manner.

In particular embodiments, the control plane may create a database record at the notification service for the first application. The site router agent may send a report to a control plane of an edge backend indicating that the first application instance becomes available at the edge site. The report may comprise the first locally unique identifying information. Upon receiving the report, the control plane may construct the first unique identifying information by combining the first globally unique identifying information with the received first locally unique identifying information. The control plane may store the first unique identifying information into a database communicatively connected to the control plane. As an example and not by way of limitation, continuing with a prior example, the site router agent 113 may send a report to the control plane 120 at an edge backend indicating that application x 117A is running at the edge site i 110. In particular embodiments, the site router agent 113 may include the first unique identifying information associated with application x 117A to the report. In particular embodiments, the site router agent 113 may include only the first locally unique identifying information associated with application x 117A to the report. Upon receiving the report, the control plane 120 may store the first unique identifying information associated with application x 117A to the database 127. If the report comprises only the first locally unique identifying information associated with application x 117A, the control plane 120 may combine the first globally unique identifying information with the locally unique identifying information in the report to construct the first unique identifying information before storing the first unique identifying information associated with application x 117A to the database 127. Once the first unique identifying information associated with application x 117A is stored at the database 127, the message router 125 may be able to route message from/to application x 117A. Although this disclosure describes creating a database record at the notification service for a new edge application in a particular manner, this disclosure contemplates creating a database record at the notification service for a new edge application in any suitable manner.

In particular embodiments, the site router agent may retrieve a first message from a message router at the edge backend. The site router agent may determine that the first message is destined to the first application instance based on a destination field of the first message. The site router agent may determine that the first message is destined to the first application instance by determining, for each position of the first unique identifying information, that an identifier at the position of the first unique identifying information matches an identifier at a corresponding position of a destination information presented in the destination field. As an example and not by way of limitation, continuing with a prior example, the site router agent 113 may retrieve a first message destined to application x 117A. The site router agent 113 may determine that application x 117A is one of one or more intended recipients of the first message by comparing the first unique identifying information associated with application x 117A with a destination information presented in a destination field of the first message. When all the identifiers of the first identifying information at all the positions match the identifiers of the destination information at corresponding positions, the site router agent 113 may determine that application x 117A is one of one or more intended recipients. Although this disclosure describes determining that a message is destined to an application instance based on a destination field of the message in a particular manner, this disclosure contemplates determining that a message is destined to an application instance based on a destination field of the message in any suitable manner.

In particular embodiments, the destination information presented in the destination field of a message may comprise a wildcard identifier at a particular position to indicate that any identifier at a corresponding position of a unique identifying information matches the wildcard identifier. As an example and not by way of limitation, continuing with a prior example, the destination information presented in the destination field of the first message may comprise * at the instance identifier position, which means the first message is destined to any application instance as long as identifiers at all the other positions of its unique identifying information match the identifiers at the corresponding positions of the destination information. As another example and not by way of limitation, the destination information presented in the destination field of the first message may comprise * at the site identifier position, which means the first message is supposed to be delivered to every edge site within a tenant identified by the tenant identifier within the destination information as long as the edge site has at least one application instance that matches the locally unique identifying information within the destination information. Although this disclosure describes matching a unique identifying information to a destination information with one or more wildcard identifiers in a particular manner, this disclosure contemplates matching a unique identifying information to a destination information with one or more wildcard identifiers in any suitable manner.

In particular embodiments, the destination information may comprise a list of identifiers at a particular position to indicate that any identifier in the list at a corresponding position of a unique identifying information matches the list of identifiers. As an example and not by way of limitation, continuing with a prior example, the destination information presented in the destination field of the first message may comprise {site i, site j, site k} for the site identifier position, which means that the first message is destined to application instances in site i, site j, and site k as long as their locally unique identifying information matches the locally unique identifying information of the destination information. In such a case, the deployment identifier in the destination information may be a list or a wildcard identifier because the deployment identifiers are locally generated on each site. As another example and not by way of limitation, the destination information presented in the destination field of the first message may comprise {0, 3, 5} for the instance identifier position, which means among the application instances matching the other identifiers of the destination information, application instances with sequence numbers 0, 3, and 5 are intended recipients of the first message. Although this disclosure describes matching a unique identifying information to a destination information with one or more identifier lists at positions in a particular manner, this disclosure contemplates matching a unique identifying information to a destination information with one or more identifier lists at positions in any suitable manner.

In particular embodiments, the site router agent may store the first message into a storage communicatively connected to the site router agent. As an example and not by way of limitation, continuing with a prior example, the site router agent 113 may not be able to establish a network connection with application x 117A immediately. In such a case, the site router agent 113 may need to send the first message to application x 117A when the network connection is established. Thus, the site router agent 113 may store the first message destined to application x 117A to the storage 115. Although this disclosure describes storing a message to a storage for a delayed transmission in a particular manner, this disclosure contemplates storing a message to a storage for a delayed transmission in any suitable manner.

In particular embodiments, the site router agent may establish a network connection with the first application instance. In particular embodiments, establishing the network connection with the first application instance may be initiated by the first application instance. The site router agent may receive a network connection request from the first application instance. The site router agent may complete the network connection establishment in response to the receiving the network connection request. As an example and not by way of limitation, continuing with a prior example, each application instance may connect to the site router agent 113 at pre-determined time instances to check whether one or more messages destined to the application instance are available. When an attempt to establish a network connection is not successful due to limited network connectivity or any other reason, the application instance may wait for a pre-calculated amount of time and reattempt to establish the network connection to the site router agent 113 by sending a network connection request. Upon receiving a network connection request from application x 117A, the site router agent 113 may complete a network connection establishment by accepting the network connection request. Although this disclosure describes establishing a network connection that is initiated by an application instance in a particular manner, this disclosure contemplates establishing a network connection that is initiated by an application instance in any suitable manner.

In particular embodiments, establishing the network connection with the first application instance may comprise initiating the establishment of the network connection by the site router agent. The site router agent may send a network connection request to the first application instance repeatedly until the site router agent receives a response to the network connection request from the first application instance. The site router agent may complete the network connection establishment upon receiving the response. As an example and not by way of limitation, continuing with a prior example, the site router agent 113 may proactively attempt to establish a network connection with application x 117A when the first message is determined to be destined to application x 117A. The site router agent 113 may send a network connection request to application x 117A. If the attempt is not successful, the site router agent 113 may retry after a pre-calculated amount of time. The site router agent 113 may keep trying to establish the network connection with application x 117A until a network connection is established. The site router agent 113 may complete the network connection establishment when receiving a network connection response from application x 117A. Although this disclosure describes establishing a network connection with an application instance by sending a network connection request to the application instance in a particular manner, this disclosure contemplates establishing a network connection with an application instance by sending a network connection request to the application instance in any suitable manner.

In particular embodiments, the site router agent may send the first message to the first application instance upon establishing the network connection. As an example and not by way of limitation, continuing with a prior example, upon completing the network connection with application x 117A, the site router agent 113 may send the first message stored in the storage 115 to application x 117A. The site router agent 113 may receive a confirmation message from application x 117A. Upon complete the transmission of the first message to application x 117A, the site router agent 113 may delete the first message stored at the storage 115. Although this disclosure describes transmitting a message to an application instance in a particular manner, this disclosure contemplates transmitting a message to an application instance in any suitable manner.

In particular embodiments, the first message may comprise an indication that a delivery notification is required. In such a case, the site router agent may forward a delivery notification to the message router indicating that the first message is successfully delivered to the first application instance after sending the first message to the first application instance. An intended receiver of the delivery notification may be a sender of the first message. As an example and not by way of limitation, continuing with a prior example, the first message may comprise an indication that a delivery notification is required. The delivery notification may be sent back to the sender of the first message with detailed information regarding a delivery of the first message including, but not limited to, a unique identifying information associated with application x 117A, delivery time, or any suitable information. When the site router agent 113 completes the transmission of the first message to application x 117A, the site router agent 113 may generate a delivery notification, whose intended recipient is the sender of the first message. The site router agent 113 may forward the delivery notification to the message router 125. The message router 125 may cause the delivery notification to be delivered to the sender of the first message. Although this disclosure describes providing a delivery notification upon completion of a message delivery in a particular manner, this disclosure contemplates providing a delivery notification upon completion of a message delivery in any suitable manner.

In particular embodiments, the site router agent may receive a second message from the first application instance. The site router agent may determine that at least one or more intended receivers of the second message are outside the edge site based on a destination field of the second message. The site router agent may forward the second message to the message router. The network connection with the message router may not be established immediately. In such a case, the site router agent may store the second message to the storage. The site router agent may establish a network connection with the message router by repeatedly attempting to connect when an attempt fails. The site router agent may send the second message to the message router via the established network connection. The site router agent may remove the second message from the storage. As an example and not by way of limitation, continuing with a prior example, the site router agent 113 may receive a second message from application x 117A. The site router agent 113 may determine that at least one of intended recipients of the second message locates outside the edge site i 110 based on destination information presented in the destination field of the second message. The site router agent 113 may store the second message to the storage 115. The site router agent 113 may establish a network connection with the message router 125 if the network connection has not been established. As the network connectivity between the message router 125 at the edge backend and the site router agent 113 at the edge site i 110 may be poor or intermittent, the site router agent 113 may need to retry a number of times before successfully establish the network connection with the message router 125. Upon establishing the network connection with the message router 125, the site router agent 113 may send the second message to the message router 125. The message router 125 may cause the second message to be delivered to each of the intended recipients. Upon successfully sending the second message to the message router 125, the site router agent 113 may delete the second message from the storage 115. Although this disclosure describes forwarding a message from a local application instance to the message router in a particular manner, this disclosure contemplates forwarding a message from a local application instance to the message router in any suitable manner.

In particular embodiments, the site router agent may receive a third message from a second application instance running in the edge site. The site router agent may determine that at least one or more intended receivers of the third message are third application instances running on the edge site based on a destination field of the third message. The site router agent may store the third message to the storage. The site router agent may send the third message to each of the third application instances. As an example and not by way of limitation, continuing with a prior example, a site router agent 113 may receive a third message from an application instance running at the edge site i 110. The site router agent 113 may determine that application x 117A, application y 117B, and application z 117C are intended recipients of the third message based on the destination field of the third message. The site router agent 113 may store the third message to the storage 115. Upon establishing a network connection with each of the intended recipients, the site router agent 113 may send the third message to the intended recipient. Although this disclosure describes delivering a message between application instances within an edge site in a particular manner, this disclosure contemplates delivering a message between application instances within an edge site in any suitable manner.

Figure 2B:
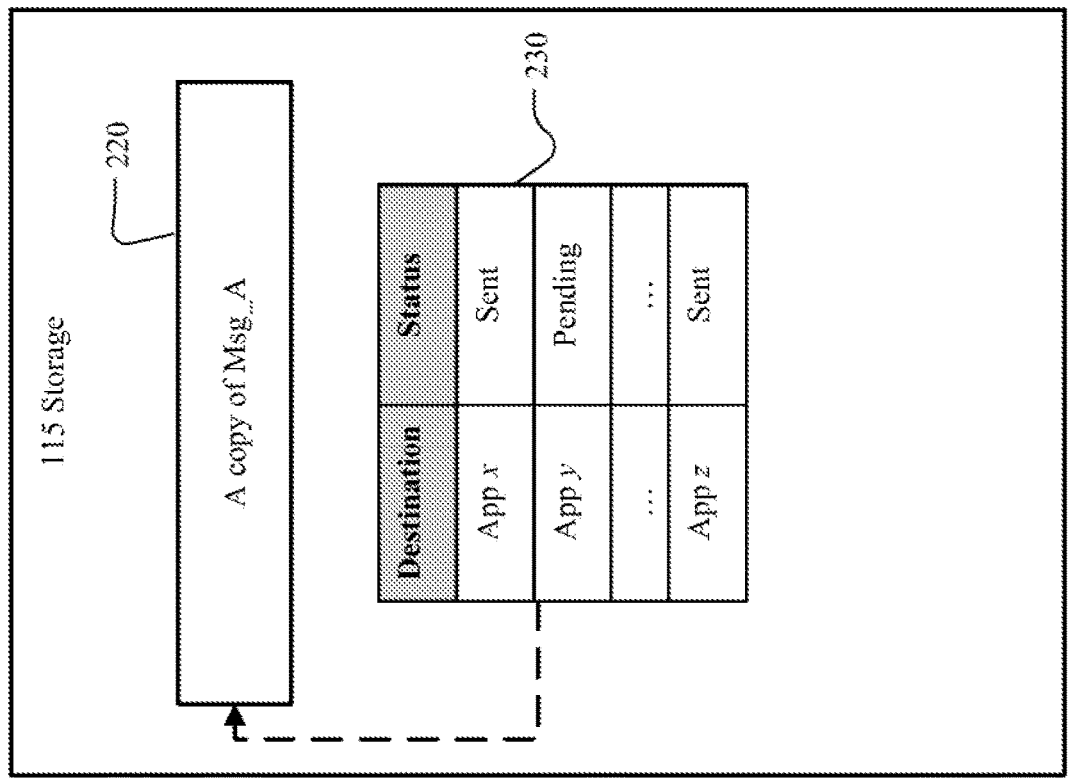
FIG. 2B illustrates another example data stored by a site router agent for delivering a message to a plurality of edge application instances.
Figure 2A:
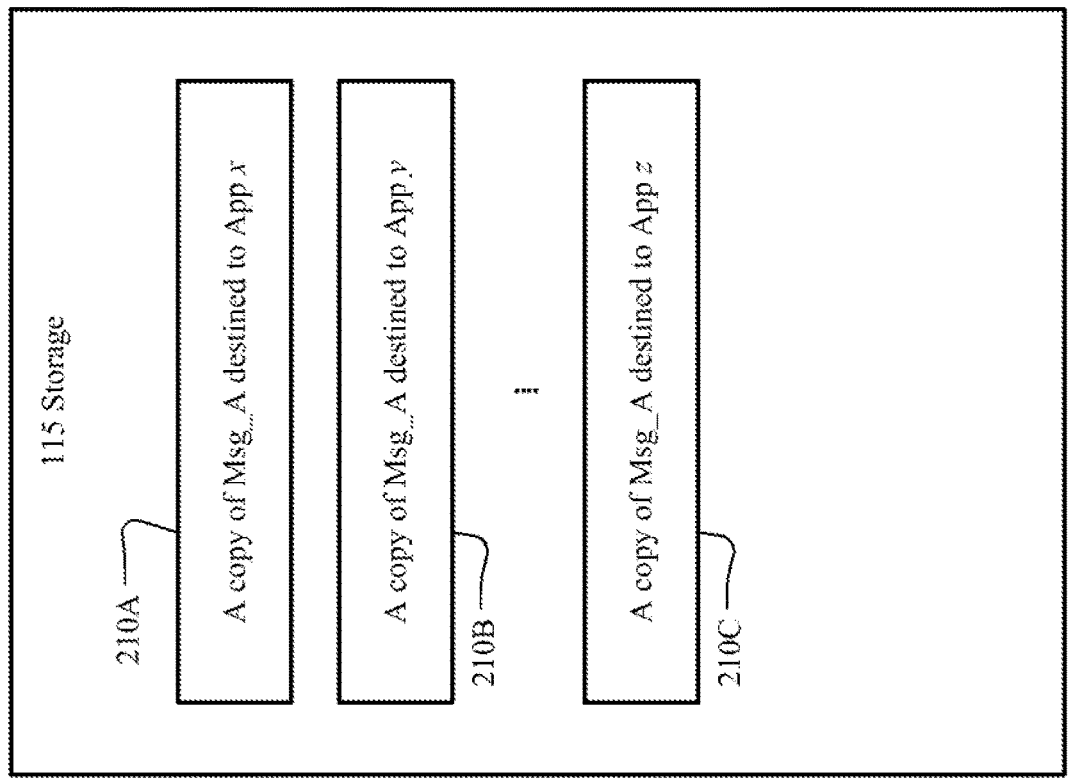
FIG. 2A illustrates an example data stored by a site router agent for delivering a message to a plurality of edge application instances.

In particular embodiments, the site router agent may store a copy of the third message for each of the third application instances. In such a scenario, the site router agent may remove a corresponding copy of the third message from the storage after sending the third message to each of the third application instances. FIG. 2A illustrates an example data stored by a site router agent for delivering a message to a plurality of edge application instances. As an example and not by way of limitation, continuing with a prior example, the site router agent 113 may store a copy of the third message for each of the intended recipients to the storage 115. A first copy 210A is destined to application x 117A. A second copy 210B is destined to application y 117B. A third copy 210C is destined to application z 117C. The site router agent 113 may delete a corresponding copy after successfully sending the third message to an intended recipient. For example, after sending the third message to application x 117A, the site router agent 113 may delete the first copy 210A of the third message from the storage 115. When the transmissions of the third message to all the intended recipients are completed, no copy of the third message may be left at the storage 115. Although this disclosure describes storing a copy of a message per each intended recipient for delayed transmissions in a particular manner, this disclosure contemplates storing a copy of a message per each intended recipient for delayed transmissions in any suitable manner.

In particular embodiments, the site router agent may store a copy of the third message and a list of the third application instances. The site router agent may update the list after sending the third message to each of the third application instance to indicate that sending the third message to the third application instance is completed. After sending the third message to all third application instances in the list, the site router agent may remove the third message and the list from the storage. FIG. 2B illustrates another example data stored by a site router agent for delivering a message to a plurality of edge application instances. As an example and not by way of limitation, continuing with a prior example, the site router agent 113 may store a copy 220 of the third message and a list 230 of intended recipients of the third message to the storage 115. Once a transmission to an intended recipient is completed, the site router agent 113 may update the list to indicate that the transmission is done. For example, in the example illustrated in FIG. 2B, the message has been sent to application x 117A and application z 117C. The message is still to be sent to application y 117B. When transmissions to all the intended recipients are completed, the site router agent 113 may delete the copy 220 of the third message and the list 230 of intended recipients of the third message from the storage 115. Although this disclosure describes storing a copy of a message and a list of intended recipients for delayed transmissions in a particular manner, this disclosure contemplates storing a copy of a message and a list of intended recipients for delayed transmissions in any suitable manner.

Figure 3:
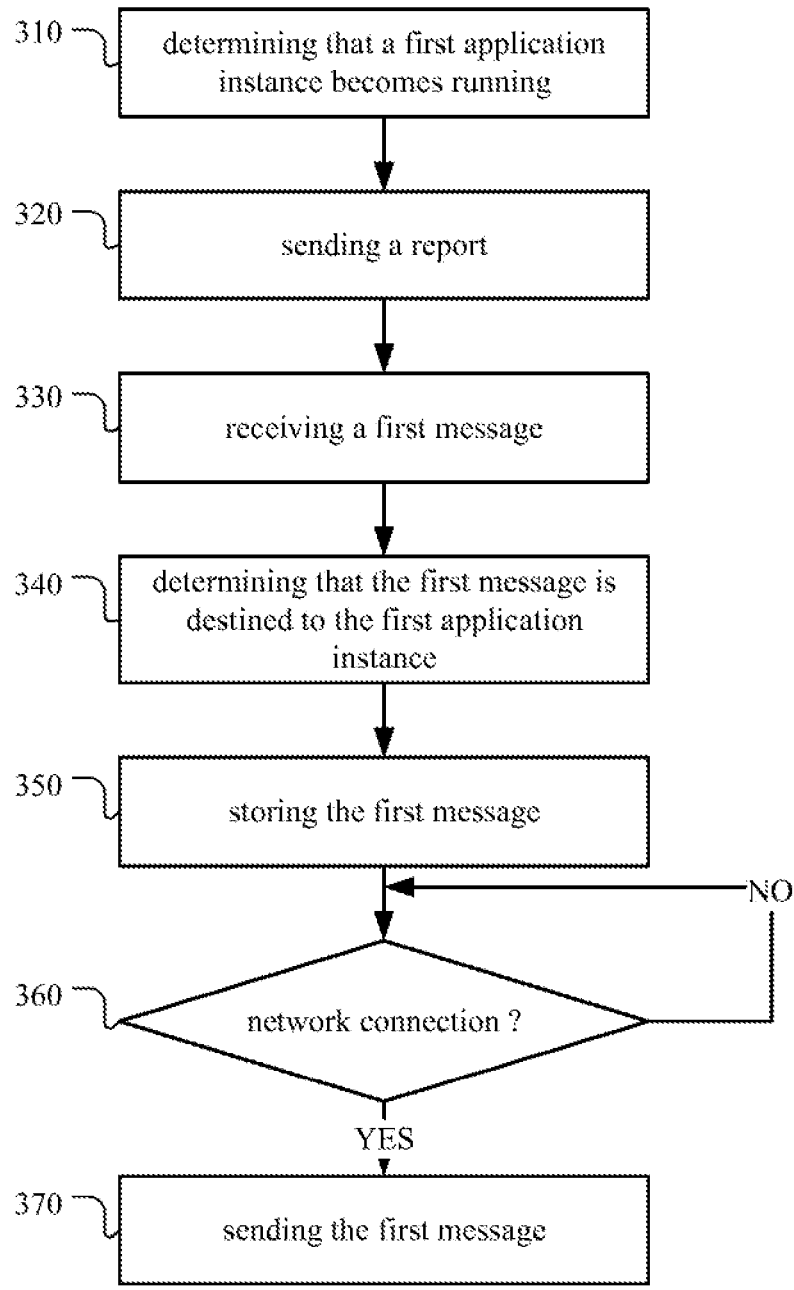
FIG. 3 illustrates an example method for delivering a message to an edge application instance.

FIG. 3 illustrates an example method 300 for delivering a message to an edge application instance. The method may begin at step 310, where a site router agent 113 may determine that a first application instance becomes running on the edge site. The first application instance may be associated with a first unique identifying information comprising a first globally unique identifying information and a first locally unique identifying information. At step 320, the site router agent 113 may send a report to a control plane of an edge backend indicating that the first application instance becomes available at the edge site. The report may comprise the first locally unique identifying information. At step 330, the site router agent 113 may retrieve a first message from a message router at the edge backend. At step 340, the site router agent 113 may determine that the first message is destined to the first application instance based on a destination field of the first message. At step 350, the site router agent 113 may store the first message into a storage communicatively connected to the site router agent. At step 360, the site router agent 113 may determine whether a network connection with the first application instance is established. The method proceed to step 370 when the site router agent 113 determines that a network connection with the first application instance is established, where the site router agent 113 may send the first message to the first application instance. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for delivering a message to an edge application instance including the particular steps of the method of FIG. 3, this disclosure contemplates any suitable method for delivering a message to an edge application instance including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
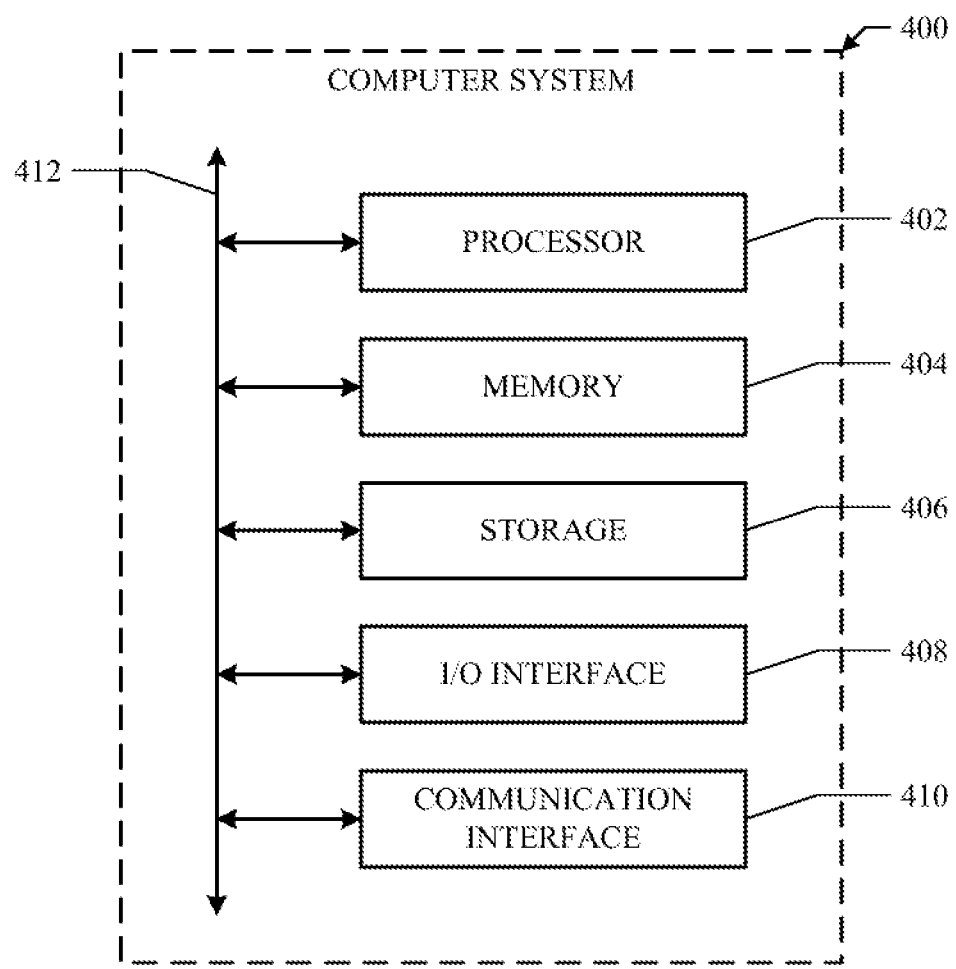
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a site router agent at an edge site:
   determining that a first application instance becomes running on the edge site, wherein the first application instance is associated with a first unique identifying information comprising a first globally unique identifying information and a first locally unique identifying information;
   sending, to a control plane of an edge backend, a report indicating that the first application instance becomes available at the edge site, the report comprising the first locally unique identifying information;
   retrieving, from a message router at the edge backend, a first message;
   determining, based on a destination field of the first message, that the first message is destined to the first application instance;
   storing the first message into a storage communicatively connected to the site router agent;
   establishing a network connection with the first application instance; and
   sending, upon establishing the network connection, the first message to the first application instance.

2. The method of claim 1, wherein the first globally unique identifying information comprises a tenant identifier and a site identifier associated with the edge site.

3. The method of claim 1, wherein the first locally unique identifying information comprises an application identifier, a deployment identifier, and an instance sequence number.

4. The method of claim 1, wherein determining the first application instance becomes running on the edge site is based on a registration request from the first application instance.

5. The method of claim 1, wherein, upon receiving the report, the control plane constructs the first unique identifying information by combining the first globally unique identifying information with the first locally unique identifying information in the report, and wherein the control plane store the first unique identifying information into a database communicatively connected to the control plane.

6. The method of claim 1, wherein determining that the first message is destined to the first application instance comprises determining, for each position of the first unique identifying information, that an identifier at the position of the first unique identifying information matches an identifier at a corresponding position of a destination information presented in the destination field.

7. The method of claim 6, wherein the destination information comprises a wildcard identifier at a particular position to indicate that any identifier at a corresponding position of a unique identifying information matches the wildcard identifier.

8. The method of claim 6, wherein the destination information comprises a list of identifiers at a particular position to indicate that any identifier in the list at a corresponding position of a unique identifying information matches the list of identifiers.

9. The method of claim 1, wherein establishing the network connection with the first application instance comprises:
   receiving a network connection request from the first application instance; and
   completing, in response to the receiving the network connection request, the network connection establishment.

10. The method of claim 1, wherein establishing the network connection with the first application instance comprises:
    sending a network connection request to the first application instance repeatedly until receiving a response to the network connection request; and
    completing the network connection establishment.

11. The method of claim 1, wherein the first message comprises an indication that a delivery notification is required, further comprising:
    forwarding, to the message router, after sending the first message to the first application instance, a delivery notification indicating that the first message is successfully delivered to the first application instance, wherein an intended receiver of the delivery notification is a sender of the first message.

12. The method of claim 1, further comprising:
    receiving, from the first application instance, a second message.

13. The method of claim 12, further comprising:
    determining, based on a destination field of the second message, that at least one or more intended receivers of the second message are outside the edge site; and
    forwarding, to the message router, the second message.

14. The method of claim 13, wherein forwarding the second message comprises:
    storing the second message to the storage;
    establishing a network connection with the message router;
    sending the second message to the message router via the established network connection; and
    removing the second message from the storage.

15. The method of claim 12, further comprising:
    determining, based on a destination field of the second message, that at least one or more intended receivers of the second message are second application instances running on the edge site;
    storing the second message to the storage; and
    sending, to each of the second application instances, the second message.

16. The method of claim 15, wherein storing the second message to the storage comprises storing a copy of the second message for each of the second application instances, further comprising:
    removing, after sending the second message to each of the second application instances, a corresponding copy of the second message from the storage.

17. The method of claim 15, wherein storing the second message to the storage comprises storing the second message and a list of the second application instances, further comprising:
    updating, after sending the second message to each of the second application instance, the list to indicate that sending the second message to the second application instance is completed.

18. The method of claim 17, further comprising:
    removing, after sending the second message to all second application instances in the list, the second message and the list from the storage.

19. A system comprising:
    one or more processors; and
    one or more computer-readable non-transitory storage media coupled to one or more of the processors and comprising instructions operable when executed by one or more of the processors to cause a site router agent at an edge site to:
- determine that a first application instance becomes running on the edge site, wherein the first application instance is associated with a first unique identifying information comprising a first globally unique identifying information and a first locally unique identifying information;
- send, to a control plane of an edge backend, a report indicating that the first application instance becomes available at the edge site, the report comprising the first locally unique identifying information;
- retrieve, from a message router at the edge backend, a first message;
- determine, based on a destination field of the first message, that the first message is destined to the first application instance;
- store the first message into a storage communicatively connected to the site router agent;
- establish a network connection with the first application instance; and
- send, upon establishing the network connection, the first message to the first application instance.

20. One or more computer-readable non-transitory storage media embodying software that is operable when executed to, by a site router agent at an edge site to:
- determine that a first application instance becomes running on the edge site, wherein the first application instance is associated with a first unique identifying information comprising a first globally unique identifying information and a first locally unique identifying information;
- send, to a control plane of an edge backend, a report indicating that the first application instance becomes available at the edge site, the report comprising the first locally unique identifying information;
- retrieve, from a message router at the edge backend, a first message;
- determine, based on a destination field of the first message, that the first message is destined to the first application instance;
- store the first message into a storage communicatively connected to the site router agent;
- establish a network connection with the first application instance; and
- send, upon establishing the network connection, the first message to the first application instance.

\* \* \* \* \*